United States Patent Office 3,188,934
Patented June 15, 1965

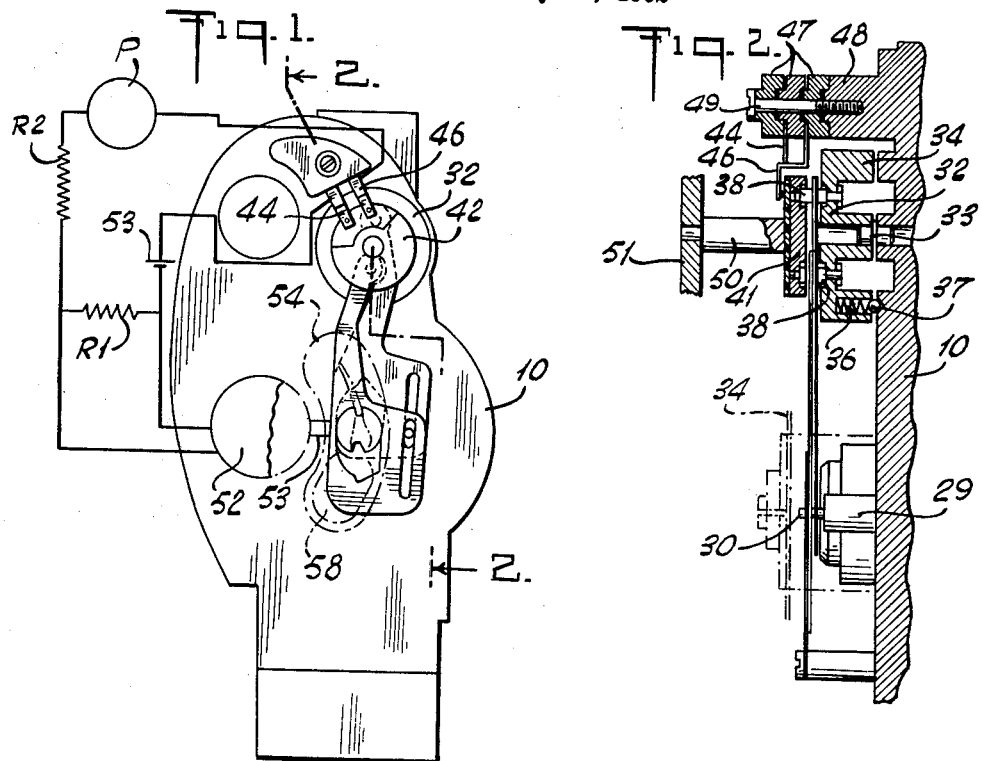

3,188,934
CAMERA DIAPHRAGM MECHANISM
Takesi Ataka, Sumiyosiku, Osaka, and Isamu Kubota, Hirakata, Osaka, Japan, assignors to Chiyoda Kogaku Seiko Kabushiki Kaisha, Minami-Ku, Osaka, Japan, a corporation of Japan
Filed July 18, 1962, Ser. No. 210,753
11 Claims. (Cl. 95—64)

The present invention relates generally to improvements in photographic cameras and it relates more particularly to an improved camera diaphragm mechanism which may be alternatively manually adjusted or which automatically responds to the ambient light conditions.

A conventional type of light responsive automatic diaphragm mechanism employs a diaphragm blade having an elongated tear drop shaped slot formed therein extending transversely across the optical axis of the camera lens. The diaphragm blade is swung by the armature of a current meter which is connected to a light sensitive element to regulate the position of the diaphragm blade to bring the larger and smaller sections of the diaphragm slot in registry with the camera lens with lower and higher light intensities respectively. The optimum lens aperture shape is circular and concentric with the lens optical axis and the optimum section of the lens is about its center. Thus, in order to compensate for the elongated aperture of the automatic diaphragm blade one or a pair of tongue elements are positioned to mask the opposite sections of the lens along the length of the diaphragm opening so as to employ the optimum portion of the lens. While this expedient improves the overall optical quality of the automatic camera, it represents a compromise, particularly at maximum and minimum lens apertures and where manual adjustment is employed.

It is, therefore, a principal object of the present invention to provide an improved photographic camera.

Another object of the present invention is to provide an improved camera diaphragm mechanism.

Still another object of the present invention is to provide an improved camera diaphragm mechanism which is selectively manually adjustable or automatically regulated in response to the ambient light conditions.

A further object of the present invention is to provide an improved camera diaphragm mechanism of the automatic and manually adjustable type wherein the optimum area of the camera lens is employed.

Still a further object of the present invention is to provide a camera diaphragm mechanism of the above nature characterized by its range of adjustment, simplicity, ruggedness and ease of operation.

The above and other objects of the present invention will become apparent from a reading of the following description taken in conjunction with the accompanying drawing wherein:

FIG. 1 is a front elevational view of a camera mounted diaphragm mechanism embodying the present invention, the automatic diaphragm being illustrated by dot and dash lines and the automatic diaphragm control circuit being diagrammatically illustrated, the diaphragm mechanism being shown in its automatic position;

FIGURE 2 is a sectional view taken along lines 2—2 in FIGURE 1;

FIGURE 3 is a front elevational fragmentary view similar to FIGURE 1, the diaphragm mechanism being illustrated in its fully open manually adjustable position;

FIGURE 4 is a view similar to FIGURE 3, the diaphragm mechanism being illustrated in its closed manually adjustable position; and FIGURE 5 is a front elevational view of the manually adjustable diaphragm blades separated from the diaphragm mechanism.

In a sense the present invention contemplates the provision of a camera diaphragm mechanism comprising a plurality of relatively movable diaphragm blades having cooperating edges delineating a variable aperture and a tongue member movable into and out of registry with said aperture with the opening and closing thereof respectively. The diaphragm blades are manually adjustable and an automatic diaphragm blade is provided having formed therein an elongated slot varying in width along the length thereof and movable across the aperture of the manually adjustable diaphragm blades, the tongue elements, when the manually adjustable blades are in their fully open position, being spaced along the length of the automatic diaphragm slot. The position of the automatic diaphragm is controlled by the armature of an electric meter movement which is connected to a light sensitive element so that the width of the automatic diaphragm slot registering with the camera lens optical axis varies inversely with the intensity of the light incident on the light sensitive element. Means are also provided for opening the circuit to the electric meter upon movement of the manually adjustable diaphragm from the position where the tongue elements register with the diaphragm aperture so as to swing the automatic diaphragm blade to a position where the widest portion of the diaphragm slot registers with the camera lens optical axis.

Referring now to the drawing which illustrates a preferred embodiment of the present invention, the reference numeral 10 generally designates the body member of a camera which may be of the motion picture type, as illustrated, or may be a still camera. Associated with the camera is a manually adjustable diaphragm mechnism which includes a pair of superimposed relatively slidable and rotatable first diaphragm blades 11 and 12 having overlapping complementary shaped openings 13 and 14 respectively formed therein and delineating a diaphragm aperture.

The blade opening 13 is provided with parallel substantially vertical side edges ending in arcuate top edges 16 which terminate at a depending tongue element 17 projecting into the opening 13. The lower section of the opening 13 is delineated by an inclined edge 18 and an arcuate edge 19 joined by a substantially vertical edge 20. The opening 14 is likewise provided with substantially vertical parallel side edges ending in arcuate bottom edges 21 which terminate at a substantially upright tongue element 22 projecting into the opening 14. The upper section of the opening 14 is delineated by an inclined edge 23 on the same side as the edge 18, and an opposite arcuate edge 24 joined by a substantially vertical edge 26. It should be noted that the tongue elements 17 and 22 have converging side edges.

Formed in each of the diaphragm blades 11 and 12 along a common side of the blade openings 13 and 14 respectively are linear vertical slots 27 and 28. Mounted on and projecting forwardly of the body member 10 is a post 29 which terminates in a pin 30 slidably engaging the slots 27 and 28 of the blades 11 and 12. A control wheel 32 is located above the post 29 and is rotatably mounted on the body member 10 by a shaft 33 registering with aligned bores formed in the hub of the wheel 32 and the body member 10. Directed rearwardly from the rim of the wheel 10 is a peripheral flange 34 having an axially parallel bore formed therein which houses a helical compression spring 36 urging a ball detent 37 toward the confronting face of the body member 10. A recess is formed in the body member 10 which releasably engages the ball detent 37 when the diaphragm mechanism is in its automatic position as will be hereinafter set forth.

A pair of diametrically opposite forwardly directed eccentric pins 38 is mounted on the control 32. Each of the diaphragm blades 11 and 12 is provided with an upwardly directed angulated connecting rod or arm 39 along a side thereof opposite a corresponding slot 27 and 28 and terminates in a circular opening 40 which engages a corresponding eccentric pin 38. The diaphragm blades 11 and 12, the lens optical axis, the slots 27 and 28 and the pins 38 are so dimensioned and related that when the pins 38 are vertically aligned as illustrated in FIGURE 1 of the drawing, the blade openings 13 and 14 overlap to form a substantially fully open diaphragm aperture aligned with the camera lens optical axis, the tongues 22 and 17 projecting toward each other in registry with the aperture. Upon rotating the wheel 32 clockwise to the position illustrated in FIGURE 3 of the drawing the diaphragm blades 11 and 12 are rocked in opposite directions to withdraw the tongue elements 17 and 22 out of registry with the diaphragm aperture and to partially mutually contract the blades 11 and 12 whereby to form a wide open circular diaphragm aperture concentric with the camera lens optical axis. Further, clockwise rotation of the control wheel 32 mutually contracts the diaphragm blades 11 and 12 to reduce the diaphragm aperture the desired degree, such aperture being likewise concentric with the camera lens optical axis. The diaphragm aperture is in its closed position with the smallest opening when the control wheel 32 is rotated about 180° from the position shown in FIGURE 1 to the position shown in FIGURE 4.

Affixed to the free ends of the pins 38 and rotatable with the wheel 32 is a coaxial, commutator disc 41 having a front face 42 of an electrically insulating material and a coplanar segment 43 of about 120°, which is formed of metal or other electrically conducting material. A pair of electrically insulated laterally spaced brushes or wiper elements 44 and 46 are disposed above the commutator disc 41 and are formed of resilient metal strips and normally urged into contact with the commutator disc front face at peripherally spaced points. The wipers 44 and 46 are supported and electrically insulated at their upper ends by being separately sandwiched between the confronting faces of stacked mating stepped insulated washer members 47 mounted by a screw 49 to a horizontal post 48 projecting forwardly from the body member 10. The wipers 44 and 46 and the commutator disc 41 define a switch which is operated concurrently with the control disc 32 and the manually adjustable diaphragm. In order to facilitate the manual adjustment of the diaphragm blades 11 and 12 and the control of the switch, a shaft 50 projects forwardly and coaxially from the disc 41 and terminates in a knob 51 accessible from the outside of the camera.

The automatic diaphragm mechanism includes a sensitive current meter 52 the armature of which is provided with a laterally projecting arm 53 supporting at its free end, forward of the diaphragm blades 11 and 12, an automatic diaphragm blade 54. Formed in the diaphragm blade 54 and concentric with the axis of swing of the meter armature is arcuately extending elongated slot 56 the longitudinal axis of which intersects the camera lens optical axis. The slot 56 gradually increases in width along the length thereof to a first somewhat enlarged opening 57 followed by a greatly enlarged terminal opening 58 which is preferably at least as large as the maximum aperture of the diaphragm blades 11 and 12.

The meter 52 is shunted by a first resistor R1 and has one terminal coupled through a series connected second resistor R2 and a photosensitive element P to the switch wiper 46. The photosensitive element P is advantageously a photoconductive cell such as a cadmium sulfide cell. The other terminal of the meter movement 52 is connected through a battery 53 to the switch wiper 44. The automatic diaphragm control circuit may be mounted on the camera in any suitable manner and its sensitivity adjustable in a manner well known in the art to permit its adjustment for different film ratings and shutter speeds.

Considering now the operation of the diaphragm mechanism described above, by manipulating the knob 51 to the position illustrated in FIGURE 1, the diaphragm blades 11 and 12 assume an open aperture position with the tongue elements 17 and 22 registering with the diaphragm aperture and the metal segment 43 engages the wipers 44 and 46 to close the switch and complete the automatic diaphragm control circuit. With high intensity light incident on the photoconductive cell P, its resistance is low so that a relatively high current is delivered to the meter 52 to swing the diaphragm blade 54 so that the narrow portion of the slot 56 registers with the camera lens optical axis. In this position, portions of the slot 56 which are laterally offset relative to the camera lens are masked by the tongues 17 and 22 so that the optimum area of the lens system is employed. As the intensity of the light incident on the photoconductive cell P is decreased the current to the meter 52 is decreased to swing the diaphragm blade 54 to a position where the width thereof in registry with the lens optical axis is greater than that of the tongues 17 and 22 and a relatively greater increased area of the lens employed.

In employing the manually adjustable diaphragm, the knob 51 is rotated to any position between those illustrated in FIGURES 3 and 4 which correspond to aperture open and closed positions respectively. In any of these positions, the automatic diaphragm circuit is open since the switch wipers 44 and 46 are disengaged by the shunting segment 43 and the meter 52 is deenergized to swing the diaphragm blade 54 to a position with the enlarged opening 58 in registry with the lens optical axis. The size of the diaphragm aperture may be fully adjusted between its open and closed position by a corresponding adjustment of the knob 51. The camera may be returned to automatic diaphragm control by rotating the knob to the position illustrated in FIGURE 1.

While there has been described and illustrated a preferred embodiment of the present invention, it is apparent that numerous alterations, omissions, and additions may be made without departing from the spirit thereof.

What is claimed is:

1. A camera diaphragm mechanism comprising a plurality of relatively movable first diaphragm blades having cooperating edges delineating a variable aperture, a tongue member movable into and out of registry with said aperture, common means for manually adjusting the relative position of said blades and said tongue member continuously from an aperture minimum opening to an aperture maximum opening unimpeded by said tongue member to an aperture maximum opening with said tongue member registering therewith, a second movable diaphragm blade having an elongated slot registering with and movable longitudinally across said aperture and varying in width along the length thereof, light sensitive means controlling the position of said second diaphragm blade, and means responsive to the movement of said first diaphragm blades from their open position to position said second diaphragm blade with the wide section of said slot registering with said aperture.

2. A camera diaphragm mechanism comprising a plurality of relatively movable first diaphragm blades having cooperating edges delineating a variable aperture, a tongue member movable into and out of registry with said aperture, common means for manually adjusting the relative positions of said blades and said tongue member continuously from an aperture minimum opening to an aperture maximum opening unimpeded by said tongue member to an aperture maximum opening with said tongue member registering therewith, a second movable diaphragm blade having an elongated slot registering with and movable longitudinally across said aperture and varying in width along the length thereof, an electric motor device connected to said second diaphragm blade and controlling the position thereof in accordance with the current thereto, an electrical network including a photosensitive element connected to said motor device and applying current thereto in accordance with the light incident on said photosensitive device, and means responsive to the movement of said first diaphragm blades from their open position for decoupling said motor from said electrical network.

3. A camera diaphragm mechanism comprising a plurality of relatively movable first diaphragm blades having cooperating edges delineating a variable aperture, a tongue member movable into and out of registry with said aperture, common means for manually adjusting the relative positions of said blades and said tongue member continuously from an aperture minimum opening to an aperture maximum opening unimpeded by said tongue member to an aperture maximum opening with said tongue member registering therewith, a second movable diaphragm blade having an elongated slot registering with and movable longitudinally across said aperture and varying in width along the length thereof, a current meter having an armature mechanically connected to said second diaphgram blade and controlling the position thereof to bring the narrower portions of said slot in registry with said aperture in direct relationship to the current thereto, an electrical network including a photosensitive element, and a normally open switch connected to said meter, and means responsive to the movement of said first diaphragm blades to their aperture open position with said tongue in registry with said aperture for closing said switch.

4. A camera diaphragm mechanism comprising a pair of first relatively movable diaphragm blades having overlapping openings formed therein delineating an aperture, oppositely directed tongue elements located on said blades and registering with the respective openings therein, means for selectively adjusting the relative positions of said blades to vary said aperture continuously successively from a minimum opening to a maximum opening unimpeded by said tongue elements to a maximum opening with said tongue elements in registry therewith, a second movable diaphragm blade having an elongated slot registering with and movable longitudinally across said aperture and varying in width along the length thereof, light sensitive means controlling the position of said second diaphragm blade, and means responsive to the movement of said tongue elements out of registry with said aperture for positioning said second diaphragm blade with the wide section of said slot registering with said aperture.

5. A camera diaphragm mechanism comprising a pair of first relatively movable diaphragm blades having overlapping opening formed therein delineating an aperture, means supporting said first diaphragm blades for mutually relative rotational and longitudinal movement, oppositely directed tongue elements located on said blades and registering with the respective openings therein, a manually rotatable control member, arms projecting from said first blades, means connecting the free ends of said arms to opposite radially offset points on said control member for selectively adjusting the relative positions of said first blades to vary said aperture continuously successively from a minimum opening to a maximum opening unimpeded by said tongue elements to a maximum opening with said tongue elements in registry therewith, a second movable diaphragm blade having an elongated slot registering with and movable longitudinally across said aperture and varying in width along the length thereof and normally urged to bring the wide portion of said slot in registry with said aperture, light sensitive means controlling the position of said second diaphragm blade, and means actuated with said control member disabling said light sensitive control means upon movement by said control member of said first blades to positions with said tongues out of registry with said aperture.

6. The camera diaphragm mechanism of claim 5 wherein said first diaphragm blades have slots formed therein offset relative to said openings formed therein, said first diaphragm support means including a stationary pin engaging said slots formed in said first blades whereby to permit the sliding and rocking of said first diaphragm blades along and about said pin.

7. The camera diaphragm mechanism of claim 5 wherein said light sensitive control means includes an electric meter having an armature connected to said second blade and a switch and a light sensitive element connected through said switch to said meter, and said disabling means includes means closing and opening said switch upon said tongues being in and out of registry with said aperture respectively.

8. The camera diaphragm mechanism of claim 7 wherein said switch includes a disc rotatable with said manual control member and having peripherally spaced conducting and insulating sections on a face thereof, and a pair of spaced contacts slidably engaging said disc face.

9. The camera diaphragm mechanism of claim 5 wherein said first blade openings are of complementary shapes.

10. The camera diaphragm mechanism of claim 5 wherein each of said first blade openings has angular converging edges opposite said respective tongues.

11. The camera diaphragm mechanism of claim 5 wherein said second blade slot is of substantially tear drop configuration.

References Cited by the Examiner

UNITED STATES PATENTS

| 2,000,037 | 5/35 | Risdorfer | 95—64 X |
| 2,999,438 | 9/61 | Nerwin | 95—64 X |
| 3,077,153 | 2/63 | Gopfert | 95—64 |

FOREIGN PATENTS

| 628,175 | 9/61 | Canada. |
| 1,095,655 | 12/60 | Germany. |
| 868,576 | 5/61 | Great Britain. |

NORTON ANSHER, *Primary Examiner.*

EMIL G. ANDERSON, *Examiner.*